United States Patent
Adachi (10) Patent No.: US 8,662,807 B2
(45) Date of Patent: Mar. 4, 2014

(54) FASTENER AND STRUCTURE FOR FASTENING A MEMBER TO BE FASTENED

(75) Inventor: Takefumi Adachi, Sagamihara (JP)

(73) Assignee: NIFCO Inc., Yokohama-Shi (JP)

( * ) Notice: Subject to any disclaimer, the term of this patent is extended or adjusted under 35 U.S.C. 154(b) by 127 days.

(21) Appl. No.: 13/138,867

(22) PCT Filed: Apr. 14, 2010

(86) PCT No.: PCT/JP2010/056700
§ 371 (c)(1),
(2), (4) Date: Dec. 20, 2011

(87) PCT Pub. No.: WO2010/119900
PCT Pub. Date: Oct. 21, 2010

(65) Prior Publication Data
US 2012/0087762 A1    Apr. 12, 2012

(30) Foreign Application Priority Data
Apr. 14, 2009 (JP) ................. 2009-097982

(51) Int. Cl.
*F16B 19/10* (2006.01)
(52) U.S. Cl.
CPC .................. *F16B 19/1081* (2013.01)
USPC ............................................. 411/45; 411/49
(58) Field of Classification Search
USPC ........................................ 411/45–51; 24/297
See application file for complete search history.

(56) References Cited

U.S. PATENT DOCUMENTS

| 5,211,519 | A | * | 5/1993 | Saito | 411/45 |
| 5,370,484 | A | * | 12/1994 | Morikawa et al. | 411/48 |
| 5,641,255 | A | * | 6/1997 | Tanaka | 411/48 |
| 5,850,676 | A | * | 12/1998 | Takahashi et al. | 24/297 |
| 5,902,083 | A | * | 5/1999 | Hwang | 411/48 |
| 6,540,461 | B1 | * | 4/2003 | Hawang | 411/48 |
| 6,685,407 | B1 | * | 2/2004 | Holzman et al. | 411/48 |

FOREIGN PATENT DOCUMENTS

| JP | U H06-045048 | 6/1994 |
| JP | 2006-207607 | 8/2006 |
| JP | 2006-226368 | 8/2006 |
| JP | 2009-041673 | 2/2009 |

* cited by examiner

*Primary Examiner* — Flemming Saether
(74) *Attorney, Agent, or Firm* — Manabu Kanesaka (57) ABSTRACT

In case when an external force in a direction of pulling out from a female member acts on a male member in a fully fastened state, the male member moves in an axial direction, and a position where claw parts of engaging leg pieces engage moves from mounting parts and to contact parts. An engaging slot is formed on the contact part, and the engaging slot therefore engages with the claw part of the engaging leg piece. Movement in the direction of rotation of the male member is thereby restricted, and the male member is moved in state along the axial direction, so that the claw parts of the engaging leg pieces do not engage with engaging holes, and a state in which a vehicle body panel and a trim board are sandwiched by a flange part and the engaging leg pieces can be maintained.

3 Claims, 10 Drawing Sheets

FASTENER AND STRUCTURE FOR FASTENING A MEMBER TO BE FASTENED

RELATED APPLICATIONS

The present application is National Phase of International Application No. PCT/JP2010/056700 filed Apr. 14, 2010, and claims priority from Japanese Application No. 2009-097982, filed Apr. 14, 2009.

BACKGROUND OF THE INVENTION

The present invention relates to a fastener, and a structure for fastening a member to be fastened, for removably fastening a trim board, or the like, to a vehicle body panel.

A trim board of a vehicle is removably fastened to a vehicle body panel by using a fastener formed of a female member and a male member.

For example, in Patent Document 1, a pair of projections is provided along a circumferential direction on an outer edge side of a lower face of a head part of a male member. Also, recessed parts are provided along a circumferential direction on a shaft part of the male member, and are delineated by partition walls of the recessed parts.

Meanwhile, an engaging indented part in which the head part of the male member is to be fitted is provided on a flange of the female member, and saw tooth-shaped cams are formed on the upper face of the engaging indented part. Projections provided on the head part of the male member are made to be able to contact with inclined surfaces constituting the saw tooth-shaped cams.

Also, slits are provided along an axial direction on a cylindrical body part of the female member, and are made so that the partition walls of the male member can be inserted. The female member is inserted into insertion holes formed on the trim board and the vehicle body panel, and the shaft part of the male member is then inserted into the cylindrical body part of the female member, while aligning the positions of the partition walls of the male member with the positions of the slits of the female member.

Here, a plurality of split pieces is formed by the slits on the cylindrical body part, a claw part is placed projecting on an inner face of each split piece, and each claw part engages with a recessed part of the shaft part of the male member. The male member is thereby provisionally fastened on the female member in a state being incapable of rotation.

This state is a state in which the head part of the male member is raised up from the recessed part of the female member, while the projections of the male member are in contact with the inclined surfaces of the saw tooth-shaped cams. When the male member is rotated from this state, the projections of the male member ride past the top parts of the inclined surfaces of the saw tooth-shaped cams, and are guided to flat parts of the saw tooth-shaped cams, and the male member is pushed inward in a depth direction of the female member.

The claw parts of the split pieces are thereby locked on locking protuberances provided at an equal spacing along the circumferential direction of the shaft part of the male member, and each split piece expands outward, and the trim board and the vehicle body panel are sandwiched between the flange and the split pieces of the female member, so that the trim board can be fastened on the vehicle body panel.

Patent Document 1: Japanese Examined Utility Model Publication No. H6-45048

However, in the case when the shaft part of the male member is pushed from a side of the front end part of the shaft part, that is to say, in the case when the male member is pushed from the back, such as by tipping (a stone, or the like hits and the male member is pushed), during assembly, in a state in which the trim board is fastened to the vehicle body panel by means of this fastener, the projections of the male member being rotated along the inclined surfaces of the saw tooth-shaped cams of the female member. In other words, the claw parts of the split pieces engage with the recessed parts, the split pieces contract in diameter, and it becomes a state in which the male member and the female member can be removed from the trim board and the vehicle body panel.

An object of the present invention, in consideration of the above circumstances, is to provide a fastener, and a structure for fastening a member to be fastened, with which a sufficiently locked state can be maintained even when the male member is pushed from behind.

BRIEF SUMMARY OF THE INVENTION

The fastener of a first embodiment according to the present invention comprises a female member and a male member. The female member comprises an annular flange part; an inclined cam formed in an annular recessed part provided on a surface of said flange part, and inclined along a circumferential direction; a plurality of engaging leg bodies hanging down from said flange part and configuring a hollow part; and a claw part provided on a leading end part of each said engaging leg body. The male member comprises a rod-form shaft part capable of being inserted from said flange part into said hollow part; a head part provided on one end part of said shaft part, formed larger than the shaft part, and received inside said recessed part; a projecting part projecting from a bottom face of said head part, for contacting said inclined cam and guiding said head part into said recessed part while rotating said shaft part; a plurality of engaging holes provided on another end part of said shaft part in a circumferential direction of the shaft part, to be engaged with said claw parts in a state in which said head part has not been received in said recessed part; an mounting part positioned on an extension of an outer surface of a partitioning wall provided between said engaging hole and engaging hole, to be contacted by said claw part removed from said engaging hole, so that said engaging leg body is pushed wider outward when said head part is received in said recessed part; and an engaging part formed along an axial direction of said shaft part on an outer surface of at least one said partitioning wall, to be engaged with said claw part so that rotation of said shaft part is restricted.

In the fastener of the first embodiment according to the present invention, the fastener comprises the female member and the male member. A recessed part in which a head part of the male member can be received is formed on the surface of an annular flange part provided on the female member, and an inclined cam inclined along the circumferential direction is provided inside the recessed part.

A projecting part projecting from the bottom face of the head part of the male member is made capable of contacting with the inclined cam. When the male member is rotated against the female member in a state in which the projecting part contacts with the inclined cam, the male member rotates by way of the projecting part along the inclined surface of the inclined cam, and moves along the axial direction, so that the head part of the male member is received inside the recessed part.

Also, a plurality of engaging leg bodies configuring a hollow part in which a shaft part of the male member can be inserted hang down from the flange part, and a claw part is formed on a leading end part of each engaging leg body.

Meanwhile, engaging holes are formed on the shaft part of the male member, and the claw parts are capable of engaging in the engaging holes in a state in which the head part has not been received inside the recessed part. The male member becomes provisionally fastened to the female member in a state in which the claw parts are engaged in the engaging holes.

Also, a partitioning wall is provided between engaging hole and engaging hole, and an mounting part for pushing the engaging leg body wider outward is provided on an extension line of an outer face of the partitioning wall. When the shaft part of the male member is rotated in a state in which the male member is provisionally fastened in the female member, the male member moves along the axial direction, and the head part of the male member is received inside the recessed part of the flange part of the female member.

At this time, the position of the engaging hole engaged with the claw part of the engaging leg body shifts in the circumferential direction and the axial direction, the claw part comes out from the engaging hole, the mounting part positioned on the extension line of the outer face of the partitioning wall contacts with the claw part, and the engaging leg body is pushed wider outward by way of the claw part. This state is a state in which the male member is fully fastened to the female member.

In other words, the female member is inserted inside attaching holes formed on an attaching member and an attached member to be mounted on the attaching member, and the male member is fully fastened to the female member in this state, whereby the attaching member and the attached member are sandwiched between the flange part of the female member and the engaging leg bodies, and attachment of the attached member on the attaching member is accomplished.

Meanwhile, an engaging part is formed along the axial direction of the shaft part on an outer surface of at least one partitioning wall. In other words, the engaging part is provided on an extension of the mounting part. In the case when the male member is pushed from the side of the front end of the shaft part (in the case when pushed from the back), in the process of operation to install the installed member on the installation-receiving member, in a state in which the male member is fully fastened to the female member (in a state in which the attached member is attached on the attaching member), the position where the mounting part is engaged with the claw part of the engaging leg body shifts along the axial direction, and the partitioning wall engages with the claw part. An engaging part for engaging with the claw part is formed on the partitioning wall, whereby the rotation of the male member is restricted in a state in which the claw part is engaged with the engaging part. In other words, the engaging hole does not engage with the claw part.

Also, because the engaging leg body is pushed wider outward in the state in which the claw part is engaged with the engaging part, the male member and the female member do not come out from the installation holes of the installation-receiving member and installed member. Also, in this state, because the head part of the male member has not been received inside the recessed part of the flange part of the female member, the male member can be fully fastened to the female member by pressing the male member so that the claw part of the engaging leg body of the female member is engaged in the mounting part.

In the fastener of a second embodiment according to the present invention, a locking part capable of locking with said claw part is provided between said mounting part and said partitioning wall in the fastener of the first embodiment.

According to the fastener of the second embodiment of the present invention, movement in a direction in which the male member is pulled out from the female member is restricted.

In the structure for fastening a member to be fastened of a third embodiment according to the present invention, the fastener according to the first or second embodiment is inserted into attaching holes formed on the attaching member and an attached member, so that said attached member is attached on said attaching member by means of said fastener.

In the structure for fastening member to be fastened of the third embodiment according to the present invention, an effect roughly identical to the effect described in the invention according to the first or second embodiment can be obtained.

Because the present invention is configured as above, a sufficiently locked state can be maintained even when the male member is pushed from the back.

DETAILED DESCRIPTION OF THE INVENTION

A fastener according to an embodiment of the present invention is described below while referring to the drawings.

Figure 7:
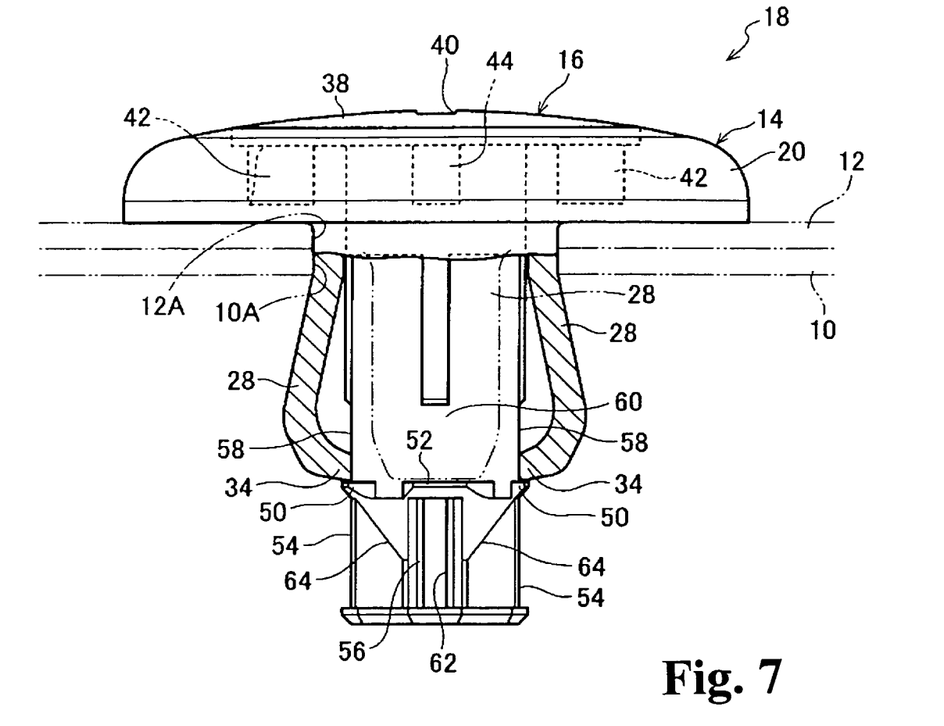
FIG. 7 is a cross-sectional view showing the fully fastened state of the fastener according to the embodiment of the present invention.

A fastener 18 formed with a female member 14 and a male member 16 is used in order to fasten a trim board (attached member) 12 to a vehicle body panel (attaching member) 10, for example, as illustrated in FIG. 7. The fastener 18 is inserted into attaching holes 10A and 12A formed on the vehicle body panel 10 and the trim board 12, and peripheral parts of the attaching holes 10A and 12A of the vehicle body panel 10 and the trim board 12 are sandwiched by the fastener 18, whereby the trim board 12 is fastened to the vehicle body panel 10.

<Fastener>

The fastener is described here.

Figure 1:
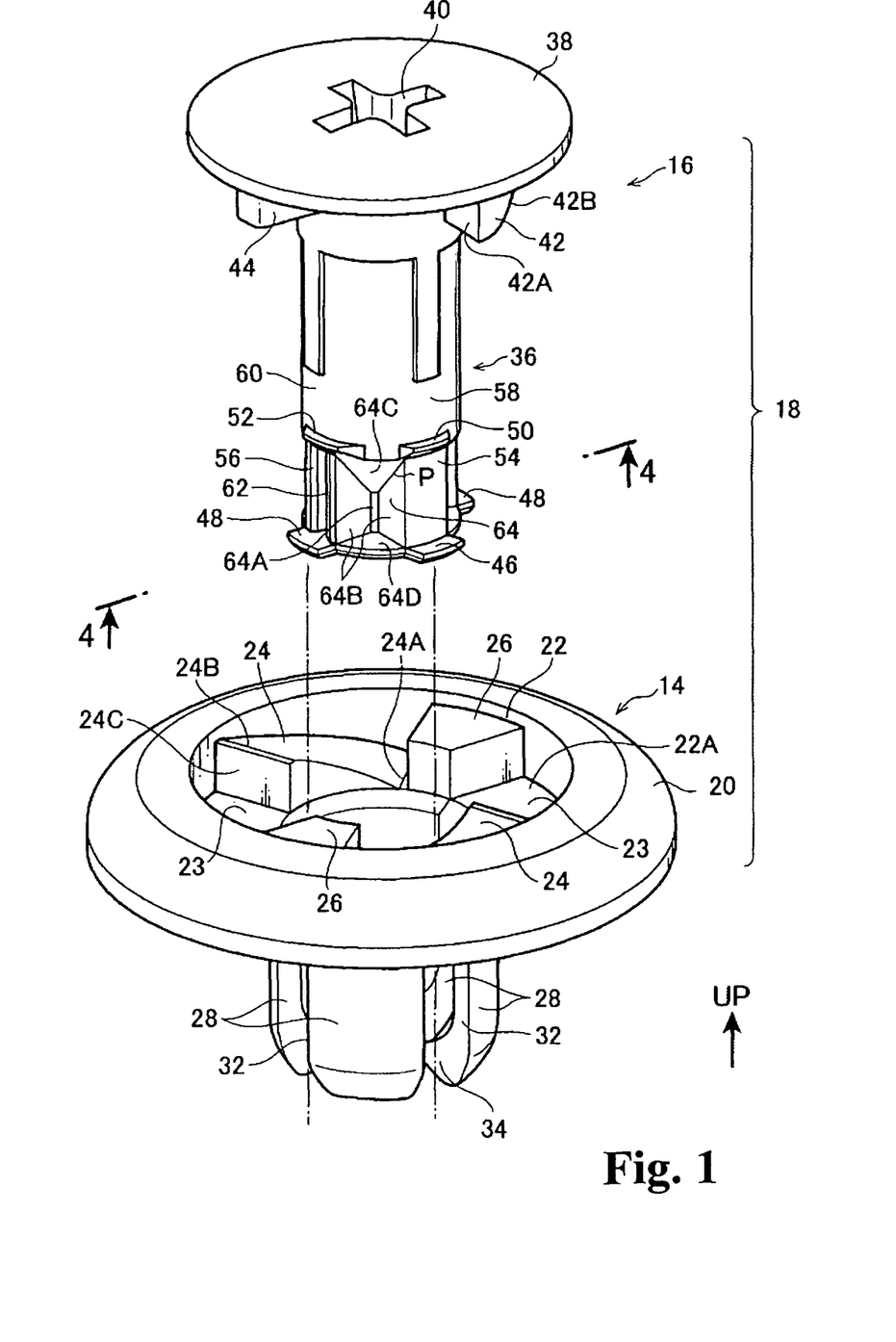
FIG. 1 is an exploded perspective view showing a fastener according to a mode of working of the present invention.

The fastener 18 is constituted by a female member 14 and a male member 16 as illustrated in FIG. 1. For convenience of description, the description is given with the direction indicated by the arrow UP as upward.

(Female Member)

The female member 14 has an annular flange part 20 having a larger diameter than the attaching holes 10A and 12A, and a roughly round columnar recessed part 22 is provided on the surface of the flange part 20.

Two inclined cams 24, inclined from an open side toward the side of a bottom part 22A of the recessed part 22, are provided mutually at a range of less than 90° clockwise along the circumferential direction on the bottom part 22A of the recessed part 22. A wall part 26 having a roughly identical height as a top part 24B of the inclined cam 24 is provided in the vicinity of a lowermost part 24A of the inclined cam 24, and a flat part 23 (bottom part 22A of the recessed part 22) is provided on the opposite side of the inclined cam 24 centered on the wall part 26.

Also, four engaging leg pieces (engaging leg bodies) 28 hang down from an inner edge part of the flange part 20, and a hollow part 30 (see FIG. 3) is formed by these engaging leg pieces 28. The engaging leg pieces 28 are made capable of being inserted into the installation holes 10A and 12A, and slit parts 32 are provided between engaging leg piece 28 and engaging leg piece 28. The engaging leg pieces 28 are made capable of being elastically deformed individually and independently from each other by these slit parts 32.

Also, the engaging leg piece 28 is positioned on the side of the flat part 23 and the lowermost part 24A of the inclined cam 24, and a claw part 34 (see FIG. 10) having a roughly triangular form when viewed in section is provided on a leading end part on the inner surface of the engaging leg piece 28.

(Male Member)

The male member 16 has a rod-form shaft part 36 capable of being inserted into the hollow part 30 of the female member 14. A head part 38 formed larger than the external shape of the shaft part 36 is provided on one end part of the shaft part 36, and the head part 38 is made capable of being received inside the recessed part 22 of the female member 14.

Figure 4:
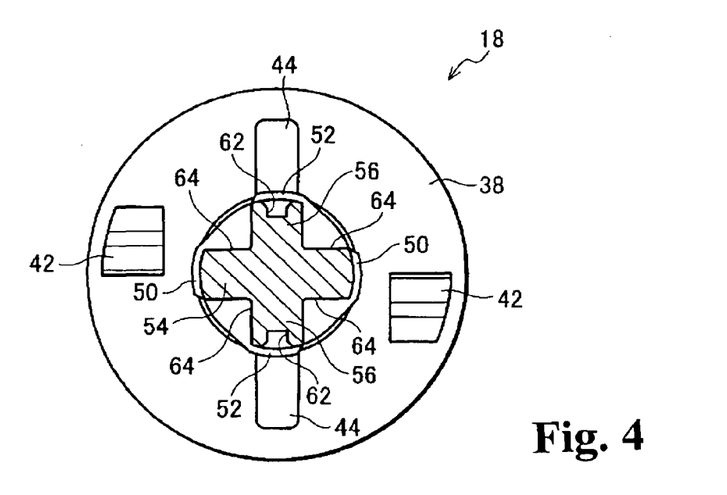
FIG. 4 is a cross-sectional view along line 4-4 in FIG. 1.

A plus slot 40 is formed on the upper face of the head part 38, and is made capable of engaging with a screwdriver, or the like. Also, two projecting parts 42 are disposed at a prescribed spacing along the circumferential direction, projecting from the bottom face of the head part 38 (see FIG. 4; FIG. 4 is a cross-sectional view along the 4-4 line in FIG. 1).

The projecting part 42 has a vertical face 42A hanging down from the bottom face of the head part 38, and an inclined surface 42B is formed going toward the bottom face of the head part 38 counterclockwise along the circumferential direction from a leading end part of the vertical face 42A. The inclined surface 42B is made capable of contacting with the inclined cam 24 provided in the recessed part 22 and moving along the top face of the inclined cam 24.

Also, a square-form contact rib 44 is placed projecting between projecting part 42 and projecting part 42, and is formed lower and narrower than the projecting part 42. Because the contact rib 44 is formed lower than the projecting part 42 and the top part 24B of the inclined cam 24 and the wall part 26 are made to roughly the same height, the contact rib 44 does not contact with the wall part 26 in the case when the projecting part 42 contacts with the top part 24B of the inclined cam 24.

In other words, in the case when the projecting part 42 contacts with the top part 24B of the inclined cam 24, the male member 16 moves downward while rotating by way of the projecting part 42 along the inclined surface of the cam 24 until the contact rib 44 contacts with the wall part 26. Downward movement of the male member 16 is restricted by the contact rib 44 in the case when the contact rib 44 contacts with the wall part 26 before the projecting part 42 contacts with the inclined cam 24.

Guide pieces 46 and 48 extend outward from the outer perimeter surface of the other end part of the shaft part 36 (the front end part of the shaft part 36), respectively in positions beneath the projecting part 42 and the contact rib 44. The guide pieces 46 and 48 are made capable of passing through the slit parts 32 provided between engaging leg piece 28 and engaging leg piece 28 of the female member 14. Here, the widths of the guide piece 46 and the guide piece 48 may be changed and the widths of the slit parts 32 may be changed in conformance with the guide pieces 46 and 48, so that the shaft part 36 does not enter into the hollow part 30 (see FIG. 3).

Also, locking pieces (locking parts) 50 and 52 are respectively placed projecting from the outer perimeter surface of the shaft part 36 on the leading end side of the shaft part 36, at a prescribed distance between the guide pieces 46 and 48 and in parallel with the guide pieces 46 and 48. For convenience of description, with the locking pieces 50 and 52 in between, the side having the guide pieces 46 and 48 is referred to as contact parts (partitioning walls) 54 and 56, and the opposite side of the guide pieces 46 and 48 is referred to as mounting parts 58 and 60.

Figure 9:
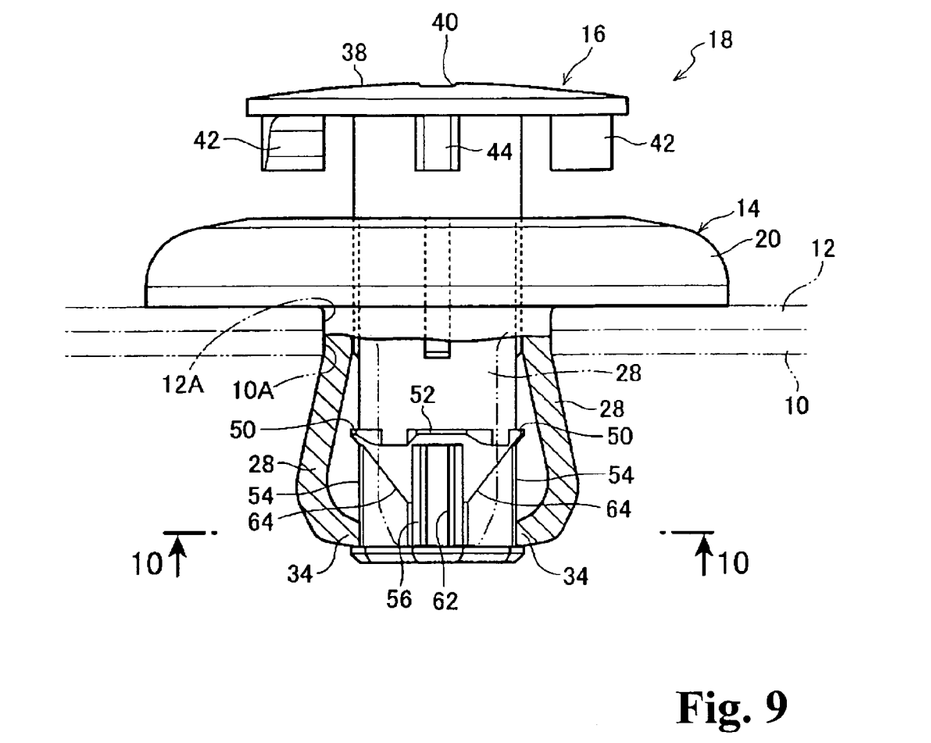
FIG. 9 is a cross-sectional view showing the state in which the male member of the fastener according to the embodiment of the present invention was pushed from the back.

The claw parts 34 of the engaging leg pieces 28 are made capable of contacting respectively with the contact parts 54 and 56 and the mounting parts 58 and 60, and when in a state in which the claw parts 34 are in contact with the contact parts 54 and 56 or the mounting parts 58 and 60, the contact leg pieces 28 are pushed wider and become in an elastically deformed state, and expand in diameter greater than the inner diameter dimension of the installation holes 10A and 12A of the vehicle body panel 10 and the trim board 12 (see FIGS. 7 and 9). Here, FIG. 7 is a cross-sectional view illustrating the state in which the claw parts 34 are in contact with the mounting parts 58 and 60, and FIG. 9 is a cross-sectional view illustrating the state in which the claw parts 34 are in contact with the contact parts 54 and 56.

Figure 5:
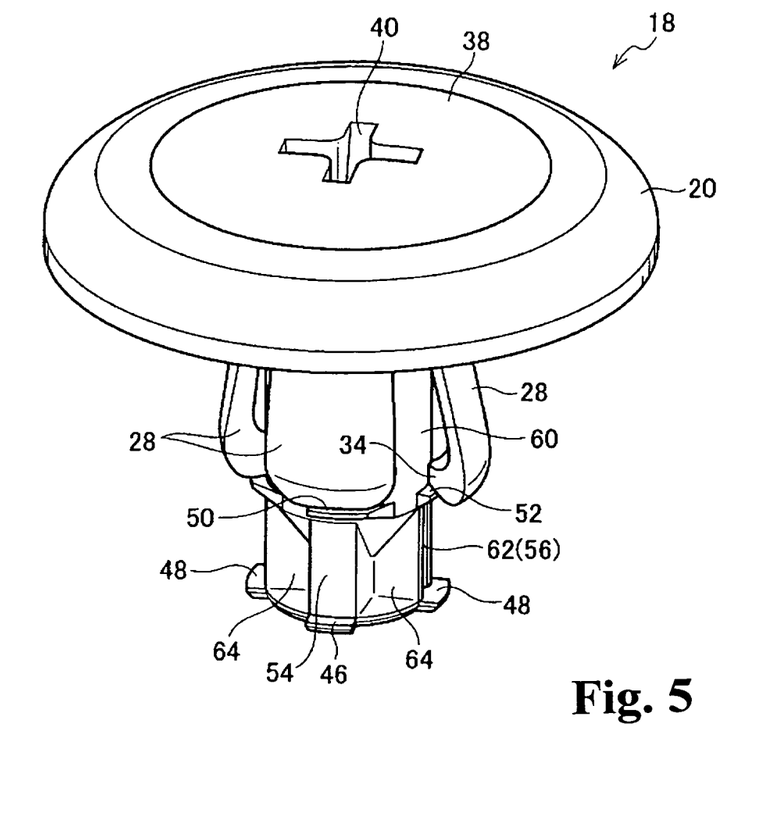
FIG. 5 is a perspective view showing the fully fastened state of the fastener according to the embodiment of the present invention.
Figure 6:
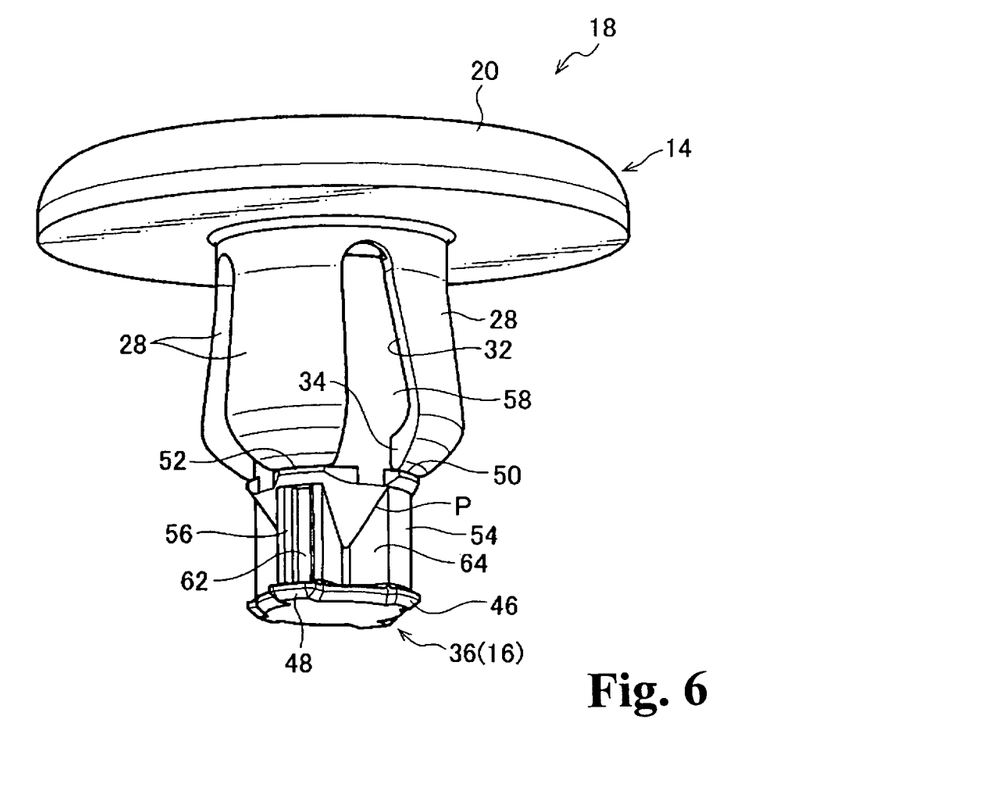
FIG. 6 is a perspective view viewed diagonally from beneath showing the fully fastened state of the fastener according to the embodiment of the present invention.

Also, in a state in which the claw parts 34 are in contact with the mounting parts 58 and 60, as illustrated in FIGS. 5 and 6, the claw parts 34 are locked on the locking pieces 50 and 52, and upward movement of the shaft part 36 (movement of the male member 16 in the direction of pulling out from the female member 14) is restricted. This state is the so-called fully fastened state of the fastener 18.

Figure 10:
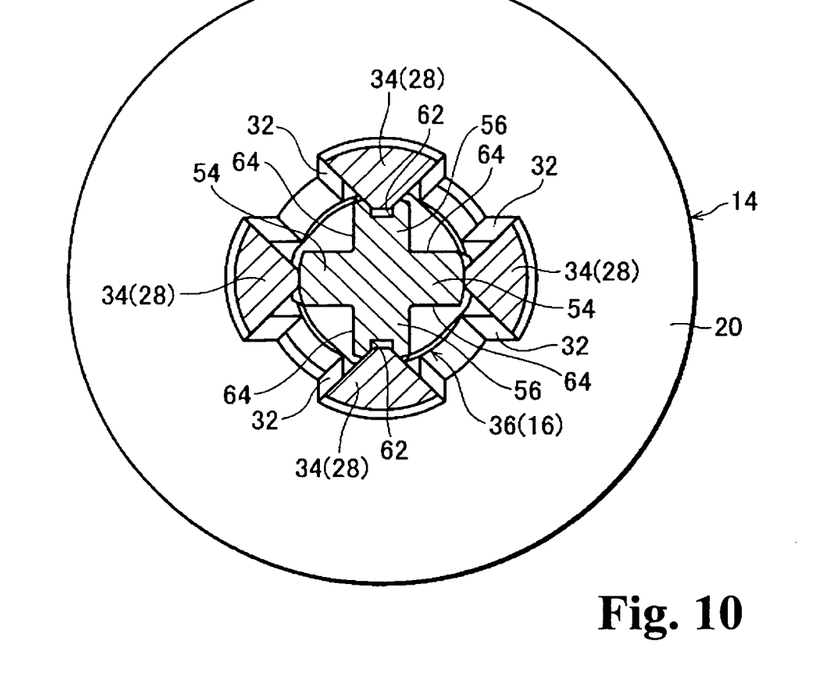
FIG. 10 is a cross-sectional view along the line 10-10 in FIG. 9.

Also, engaging slots (engaging parts) 62 are provided along the axial direction of the shaft part 36 in the center part of the circumferential direction of the contact parts 56, and are made capable of being engaged with the tip parts of the claw parts 34 of the engaging leg pieces 28 (see FIG. 10). In a state in which the claw parts 34 are engaged with the engaging slots 62, the amount of elastic deformation of the engaging leg pieces 28 becomes less than that in the state in which the claw parts 34 are in contact with the contact parts 54, but as stated previously, the engaging leg pieces 28 are pushed wider and in an elastically deformed state, and are expanded in diameter greater than the inner diameter dimension of the attaching holes 10A and 12A of the vehicle body panel 10 and the trim board 12.

Meanwhile, an engaging hole 64 is provided between the contact part 54 and the contact part 56. This engaging hole has a roughly square pyramidal form, and the outer edge part has a square shape. A bottom part 64A of the engaging hole 64 has a rectangular form along the direction of the shaft part 36, and is positioned on the side of the leading end part of the shaft part 36.

An inclined surface 64B is formed in the engaging hole 64 along the circumferential direction of the shaft part 36 from the upper outer edge part to the bottom part 64A of the engaging hole 64. Also, an inclined surface 64C is formed along the axial direction of the shaft part 36 from the upper outer edge part to the bottom part 64A of the engaging hole 64, and a horizontal surface 64D is formed from the lower outer edge part to the bottom part 64A of the engaging hole 64.

Figure 3:
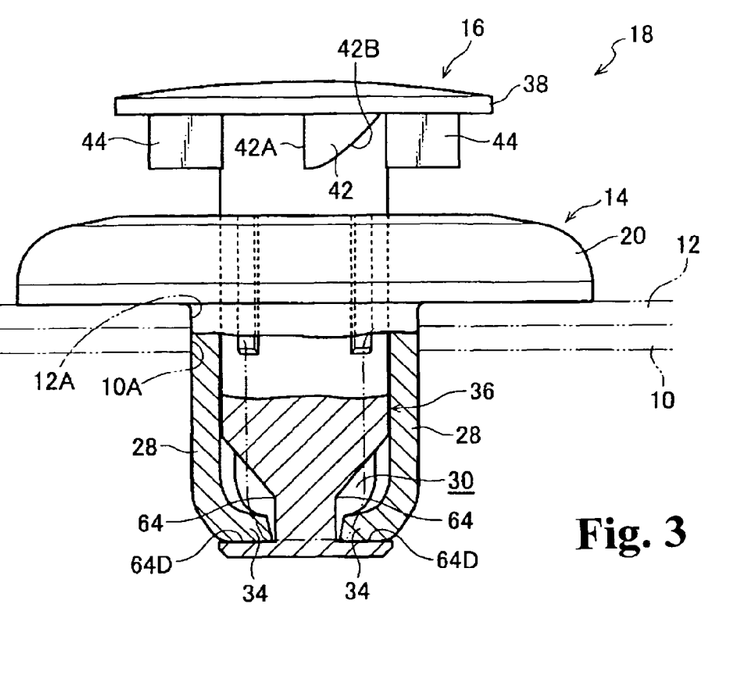
FIG. 3 is a sectional view showing the provisionally fastened state of the fastener according to the embodiment of the present invention.

The claw part 34 of the engaging leg piece 28 is made capable of engaging in the engaging hole 64, and the engaging leg piece 28 is in a natural state when in a state in which the claw part 34 of the engaging leg piece 28 is engaged in the engaging hole 64 and is in contact with the horizontal surface 64D, as illustrated in FIG. 3. In other words, it is a state of not being elastically deformed, and is the so-called provisionally fastened state of the fastener 18.

<Operation and Effect of the Fastener>

The engaging leg pieces 28 of the female member 14 are inserted into the attaching hole 10A and the attaching hole 12A in a state in which the attaching hole 10A of the vehicle body panel 10 (see FIG. 3) and the attaching hole 12A of the trim board 12 are aligned in position. The flange part 20 of the female member 14 is in contacts with the peripheral part of the attaching hole 12A of the trim board 12, and movement of the female member 14 is restricted.

Figure 2:
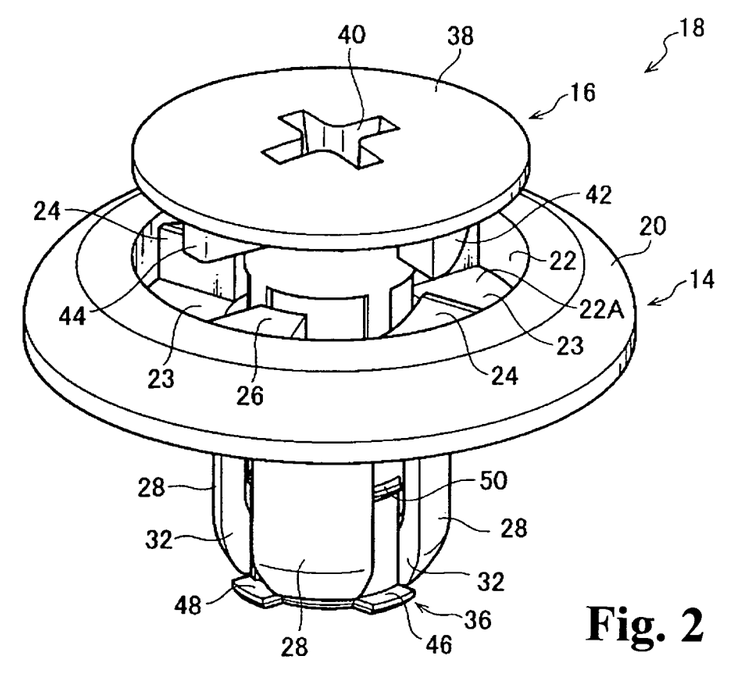
FIG. 2 is a perspective view showing the provisionally fastened state of the fastener according to the embodiment of the present invention.

In a state in which the flange part 20 of the female member 14 is in contact with the peripheral part of the installation hole 12A of the trim board 12, the shaft part 36 of the male member 16 is inserted into the hollow part 30 from the flange part 20 of the female member 14, so that the position of the guide pieces 46 and 48 provided on the leading edge part of the shaft part 36 of the male member 16 becomes on the same axes as the slit parts 32 of the female member 14, as illustrated in FIGS. 1 and 2.

The guide pieces 46 and 48 are thereby inserted into the slit parts 32, and the engaging holes 64 of the shaft part 36 confront the inner surfaces of the engaging leg pieces 28. When the male member 16 is pushed further in this state, the projecting parts 42 of the male member 16 contact on the side of the top parts 24B of the inclined cams 24 of the female member 14, and the contact ribs 44 contact with the wall parts 26.

Here, in the case when the positions of the guide pieces 46 and 48 are slightly shifted from being on the same axes of the slit parts 32, because the contact ribs 44 are formed lower than the projecting parts 42, the male member 16 moves downward while rotating by way of the projecting parts 42 along the inclined surfaces of the inclined cams 24 when the projecting parts 42 contact with the top parts 24B of the inclined cams 24, and the guide pieces 46 and 48 are thereby positioned on the same axes as the slit parts 32.

Also, when in a state in which the projecting parts 42 of the male member 16 are in contact on the side of the top parts 24B of the inclined cams 24 of the female member 14 and the contact ribs 44 are in contact with the wall parts 26, the engaging holes 64 reach the claw parts 34 of the engaging leg pieces 28, and the claw parts 34 engage with the engaging holes 64 as illustrated in FIG. 3. In other words, it is the provisionally fastened state of the fastener 18. At this time, engaging leg pieces 28 are in a generally natural state.

Also, this state is a state in which the head part 38 of the male member 16 has not been received inside the recessed part 22 of the female member 14, and is raised up from the top face of the flange part 20, as illustrated in FIG. 2.

In the above description, the male member 16 is engaged with the female member 14 after the engaging leg pieces 28 of the female member 14 are inserted into the attaching hole 10A and the attaching hole 12A, engaging leg pieces 28 of the fastener 18 in the provisionally fastened state (see FIG. 3) may be inserted into the attaching hole 10A and the attaching hole 12A.

Also, when the male member 16 is rotated clockwise in the provisionally fastened state of the fastener 18, the contact ribs 44 drop from the wall parts 26 and are positioned on the flat parts 23 (bottom parts 22A of the recessed part 22), and the projecting parts 42 move from the side of the top parts 24B to the side of the lowermost parts 24A of the inclined cams 24B, and the male member 16 is pushed inward in the depth direction of the female member 14. In other words, the rotational force acting on the male member 16 by the inclined cams 24 is used to generate an axial force causing movement in the axial direction of the shaft part 36 on the male member 16.

The positions of the engaging holes 64 shift by the movement in the circumferential and axial directions of the male member, the positions of contact of the claw parts 34 move along a boundary line P between the inclined surfaces 64B and the inclined surfaces 64C of the engaging holes 64, the claw parts 34 are removed from the engaging holes 64, and the locking pieces 50 and 52 ride past the claw parts 34, and the mounting parts 58 and 60 (outer perimeter surfaces of the shaft part 36) contact with the claw parts 34 as illustrated in FIGS. 5 to 7. At this time, the head part 38 of the male member 16 is received inside the recessed part 22 of the female member 14.

In other words, this state is the fully fastened state of the fastener 18, and is a state in which the engaging leg pieces 28 are pushed wider. The vehicle body panel 10 and the trim board 12 can thereby be sandwiched between the flange part 20 and the engaging leg pieces 28, and the trim board 12 is fastened to the vehicle body panel 10.

In this state, the projecting parts 42 have moved to the lowermost parts 24A of the inclined cams 24, the vertical faces 42A of the projecting parts 42 are in contact with the wall parts 26, and clockwise rotational movement of the male member 16 is restricted.

Here, clockwise rotational movement of the male member 16 is restricted, but because the projecting parts 42 are in contact with the inclined cams 24, the male member 16 becomes subject to a component force pushing in a direction to rotate clockwise by way of the inclined cams 24 and the inclined faces 42B. In other words, a force to push the male member 16 inward in the depth direction of the female member 14 acts in the fully fastened state, whereby movement of the male member 16 against the male member 16 is restricted, and rattling, between the male member 16 and the female member 14 can be absorbed.

Also, in the fully fastened state, the contact ribs 44 are positioned on the flat parts 23, and a gap is provided between the contact ribs 44 and upright walls 24C of the inclined cams 24. The male member 16 can therefore be rotated counterclockwise against the female member 14.

Meanwhile, in the case when an external force in the direction of pulling out from the female member 14 (the direction going from the shaft part 36 to the head part 38 of the male member 16) acts on the male member 16 (so-called pushing from the back) in the fully fastened state, the male member 16 moves in the axial direction, and the positions where the claw parts 34 of the engaging leg pieces 28 contact move from the mounting parts 58 and 60 to the contact parts 54 and 56.

Figure 8:
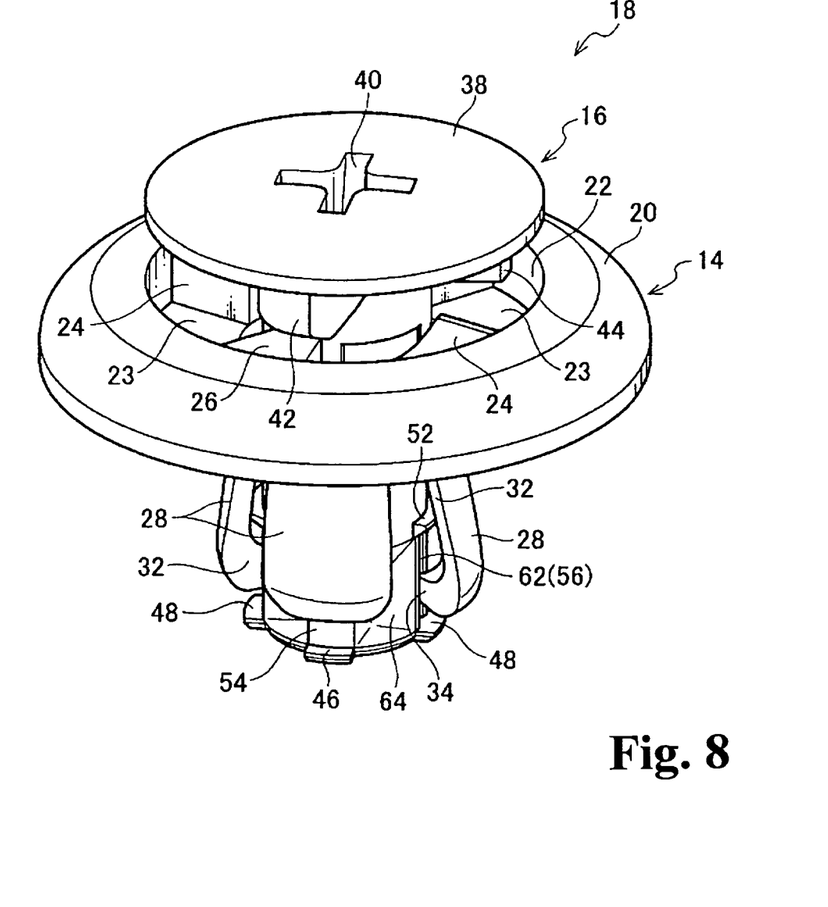
FIG. 8 is a perspective view showing the state in which the male member of the fastener according to the embodiment of the present invention was pushed from the back.

Because the engaging slots 62 are formed on the contact parts 56, the engaging slots 62 engage with the claw parts 34 of the engaging leg pieces 28 as illustrated in FIGS. 8 to 10. Rotation of the male member 16 is thereby restricted, and the male member 16 is moved in state along the axial direction, so that the claw parts 34 of the engaging leg pieces 28 do not engage with the engaging holes 64.

Because the engaging parts 54 and the engaging parts 56 are the outer perimeter surface of the shaft part 36, the amount of spread of the engaging leg pieces 28 contacting with the contact parts 56 is the same as in the state in which the claw parts 34 of the engaging leg pieces 28 are in contact with the mounting parts 58 and 60. On the other hand, because the engaging slots 62 are formed on the contact parts 56, the amount of spread of the engaging leg pieces 28 becomes smaller than in the state in which the claw parts 34 of the engaging leg pieces 28 are in contact with the mounting parts 58 to 60, but it is a state in which the engaging leg pieces are expanded in diameter greater than the inner diameter dimension of the installation holes 10A and 12A of the vehicle body panel 10 and the trim board 12.

In other words, even though the positions where the claw parts 34 of the engaging leg pieces 28 contact have moved from the mounting parts 58 and 60 to the contact parts 54 and 56, the state in which the vehicle body panel 10 and the trim board 12 are sandwiched by the flange part 20 and the engaging leg pieces 28 can be maintained.

Also, because this state is a state in which the head part 38 of the male member 16 was raised up from the recessed part 22 of the female member 14, the fact that the fastener 18 is not in the fully fastened state can be visually discriminated. Therefore, when the head part 38 of the male member 16 is pressed, the positions where the claw parts 34 of the engaging leg pieces 28 contact move from the contact parts 54 and 56 to the mounting parts 58 and 60, and the head part 38 is received inside the recessed part 22.

Incidentally, the male member 16 is rotated counterclockwise against the female member 14 in the case when removing the male member 16 from the female member 14. The projecting parts 42 thereby move from the bottom parts to the top parts of the inclined cams 24, the male member 16 concomitantly moves upward, the head part 38 is raised up from inside the recessed part 22 of the female member 14, the engaging holes 64 move to the positions for engaging with the claw parts 34 of the engaging leg pieces 28, the engaging holes 64 and the claw parts 34 engage, and the engaging leg pieces 28 are restored.

The state in which the vehicle body panel 10 and the trim board 12 are sandwiched between the flange part 20 and the engaging leg pieces 28 is thereby released, and the fastener 18 in this state can be removed from the installation holes 10A and 12A of the vehicle body panel 10 and the trim board 12.

It goes without saying that the present embodiment is only one embodiment example, and that suitable modifications are possible within a scope not deviating from the main points of the present invention.

<Other Embodiments>

Figure 11:
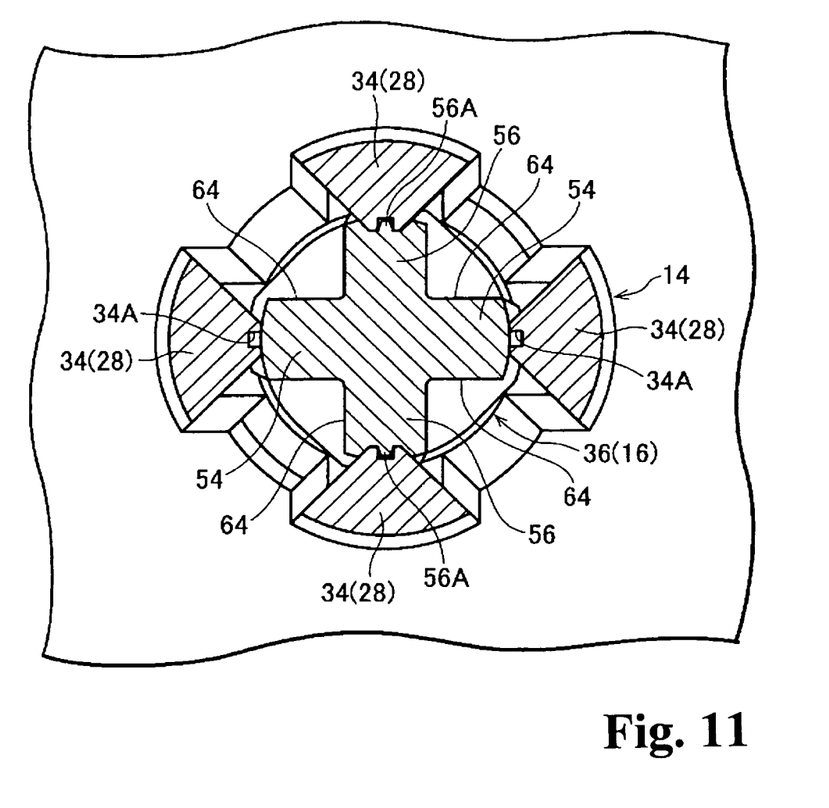
FIG. 11 is a modified example of FIG. 10.

In the present embodiment, the engaging slot 62 is provided on the contact part 56, and the tip part of the claw part 34 of the engaging leg piece 28 engages with the engaging slot 62, as illustrated in FIG. 10 as one example, but the invention is not limited to this form, because it is sufficient that rotation of the male member 16 be restricted. For example, an engaging indented part 34A may be provided on the tip part of the claw part 34, and a engaging irregular-surface part 56A capable of engaging with the tip part of the claw part 34 and the engaging recessed part 34A may be provided on the front face of the contact part 56, as illustrated in FIG. 11.

Also, as illustrated in FIG. 10, the engaging slot 62 was provided only on the contact part 56 as illustrated in FIG. 10, but the engaging slot 62 may also be provided on the contact part 54.

Furthermore, the projecting part 42 and the contact rib 44 were provided on the male member 16, and the inclined cam 24 to be contacted by the projecting part 42 and the wall part 26 to be contacted by the contact rib 44 were provided in the recessed part 22 of the female member 14, but at least the inclined cam 24 and the projecting part 42 should be provided, because an axial force should be generated by the rotational force of the male member 16.

EXPLANATION OF THE SYMBOLS

10 Vehicle body panel (installation-receiving member)
12 Trim board (installed member)
14 Female member
16 Male member
18 Fastener
20 Flange part (female member)
22 Recessed part
24 Inclined cam (male member)
28 Engaging leg piece (engaging leg body, female member)
30 Hollow part
34 Claw part (female member)
36 Shaft part (male member)
38 Head part (male member)
42 Projecting part (male member)
50 Locking piece (locking part)
54 Contact part (partitioning wall, male member)
56A Engaging irregular-surface part (engaging part, male member)
56 Contact part (partitioning wall, male member)
58 Mounting part (male member)
62 Engaging slot (engaging part, male member)
64 Engaging hole (male member)

What is claimed is:

1. A fastener, comprising:
    a female member including:
        an annular flange part;
        an inclined cam formed inside an annular recessed part arranged on a surface of said flange part, and angled along a circumferential direction;
        a plurality of engaging leg bodies hanging down from said flange part and forming a hollow part; and
        claw parts, each being disposed on a leading end part of each of said engaging leg bodies; and
    a male member including:
        a shaft part shaped as a rod for inserting from said flange part into said hollow part;
        a head part disposed on one end part of said shaft part and shaped larger than the shaft part, said head part being configured to be accommodated inside said recessed part;
        a projecting part projecting from a bottom face of said head part and contacting said inclined cam, said projecting part being configured to guide said head part into said recessed part while rotating said shaft part;
        a plurality of engaging holes arranged on another end part of said shaft part in a circumferential direction of the shaft part, said engaging holes being configured to engage with said claw parts in a state in which said head part is not accommodated in said recessed part;
        a mounting part positioned on an extension of an outer surface of a partitioning wall arranged between said engaging holes, said mounting part being configured to contact with said claw parts released from said engaging holes and expand the engaging leg body outward when said head part is accommodated in said recessed part; and an engaging slot arranged along an axial direction of said shaft part on an outer surface of at least one of said partitioning walls, the engaging slot being configured to engage with one of said claw parts to restrict the rotation of said shaft part.

2. A fastener according to claim 1, further comprising a locking part for locking one claw part and disposed between said mounting part and one partitioning wall.

3. A structure for fastening a member to be fastened, by mounting the fastener according to claim 1 to the attaching holes arranged on the attaching member and attached member, to attach said attached member to the attaching member through the fastener.

\* \* \* \* \*